(12) United States Patent
Wang

(10) Patent No.: US 7,396,124 B1
(45) Date of Patent: Jul. 8, 2008

(54) POSITIONING STRUCTURE FOR AUXILIARY EYEGLASSES

(75) Inventor: Ching-Hsiang Wang, Tainan (TW)

(73) Assignee: Day Sun Industrial Corp., Tainan (TW)

( * ) Notice: Subject to any disclaimer, the term of this patent is extended or adjusted under 35 U.S.C. 154(b) by 5 days.

(21) Appl. No.: 11/674,282

(22) Filed: Feb. 13, 2007

(51) Int. Cl.
*G02C 9/00* (2006.01)
*G02C 11/08* (2006.01)

(52) U.S. Cl. ............................. 351/47; 351/57; 351/62

(58) Field of Classification Search .................. 351/47, 351/48, 57, 58, 44, 41, 158, 62; 2/435
See application file for complete search history.

(56) References Cited

U.S. PATENT DOCUMENTS 6,641,263 B2 * 11/2003 Olney ........................... 351/62
6,749,299 B1 * 6/2004 Hsu ............................. 351/62
7,192,134 B2 * 3/2007 Teng ............................ 351/47

* cited by examiner

*Primary Examiner*—Hung X Dang
(74) *Attorney, Agent, or Firm*—Alan Kamrath; Kamrath & Associates PA

(57) ABSTRACT

A positioning structure for auxiliary eyeglasses comprises an auxiliary eyeglass frame of auxiliary eyeglasses with an additional function, having a bridge provided with a receiving space and a through hole formed on a back wall of the receiving space. A protective strip combined to the auxiliary eyeglass frame is provided with an inserting portion extending downwardly from a central portion and having a first projection projected rearward so that the inserting portion can be inserted into the receiving space with the first projection being engaged with the through hole. A pair of second projections are provided on each end of the protective strip for being inserting into a recess formed on each end of a main eyeglass frame. Hereby the auxiliary eyeglass frame with the protective strip can be stably and speedily attached/detached to/from the main eyeglass frame.

1 Claim, 3 Drawing Sheets

POSITIONING STRUCTURE FOR AUXILIARY EYEGLASSES

FIELD OF THE INVENTION

The present invention relates to a positioning structure for auxiliary eyeglasses, and more particularly to a positioning structure for easily positioning and mounting an attachable frame of auxiliary eyeglasses with an additional function on various types of main eyeglasses, so as to stably and speedily attach/detach the auxiliary eyeglasses to/from the main eyeglasses.

BACKGROUND OF THE INVENTION

Presently, traditional eyeglasses can be classified into nearsighted glasses for correcting the nearsightedness of nearsighted users, ornamental eyeglasses for making one fashionable, and sunglasses for blocking the strong sunlight. To increase wearing convenience, related manufacturers develop and design various attaching structures for attaching auxiliary eyeglasses having an additional function to main eyeglasses with a main function, in order to avoid additionally preparing another pair of eyeglasses having the additional function, such as the sunglasses. Attaching structures for auxiliary eyeglasses have various different designs. For example, a plurality of magnets are used as the attaching structure, wherein the magnets are provided on two extensions of a frame of main eyeglasses and two connecting arms of a frame of auxiliary eyeglasses for positioning the auxiliary eyeglasses on the main eyeglasses by the magnetically attractive force between the magnets. Alternatively, a plurality of screwing members are used as the attaching structure, wherein the screwing members are screwed through two extensions of a frame of main eyeglasses into two connecting arms of a frame of auxiliary eyeglasses for positioning the auxiliary eyeglasses on the main eyeglasses. Similarly, a pair of engaging hooks can be used as the attaching structure, wherein the engaging hooks are provided on a frame of main eyeglasses and a frame of auxiliary frame for positioning the auxiliary eyeglasses on the main eyeglasses by engaging with each other.

It is therefore tried by the inventor to develop a positioning structure for auxiliary eyeglasses to improve the conventional attaching structures between main eyeglasses and auxiliary eyeglasses as described above, so as to simplify the manufacture of the auxiliary eyeglasses, stably position the auxiliary eyeglasses on the main eyeglasses, and easily detach the auxiliary eyeglasses from the main eyeglasses.

SUMMARY OF THE INVENTION

The present invention is directed to a positioning structure for auxiliary eyeglasses for positioning and attaching an auxiliary eyeglass frame of the auxiliary eyeglasses having an additional function on a main eyeglass frame of main eyeglasses having a main function.

An object of the present invention is to provide an auxiliary eyeglass frame of auxiliary eyeglasses having an additional function, a protective strip, and main eyeglasses having a main function. The auxiliary eyeglass frame is formed with a receiving space penetrated through a bridge thereof, having a through hole on a back wall. The protective strip is adapted to be combined with the auxiliary eyeglass frame and formed with an inserting portion extending downwardly and having a first projection projected rearward. Each end of the protective strip is provided with a pair of second projections. To assemble the main eyeglasses and the auxiliary eyeglasses, the inserting portion of the protective strip is correspondingly inserted into the receiving space of the auxiliary eyeglass frame with the first projection of the inserting portion being engaged with the through hole of the receiving space. The second projections on each end of the protective strip are correspondingly inserted into the recess of a main eyeglass frame of the main eyeglasses. Hereby the main eyeglasses frame, the auxiliary eyeglass frame and the protective strip are secured to one another firmly by inserting operation and engaging operation as described above.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
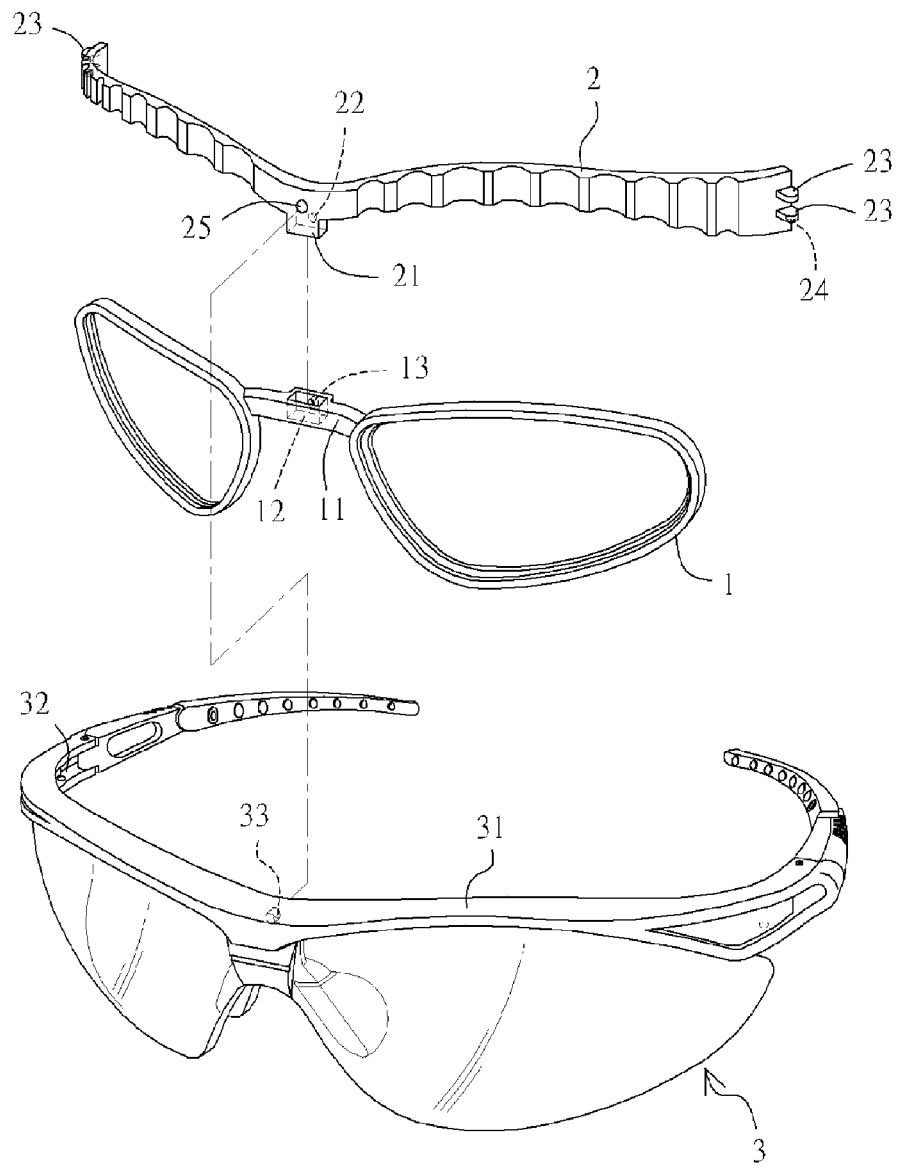
FIG. 1 is an exploded perspective view of a protective strip, an auxiliary eyeglass frame and main eyeglasses according to a preferred embodiment of the present invention.

Referring now to FIG. 1, a positioning structure for auxiliary eyeglasses according to a preferred embodiment of the present invention is illustrated. As shown, the auxiliary eyeglasses have an auxiliary eyeglass frame 1 for supporting a pair of lenses with an additional function. By a protective strip 2, the auxiliary eyeglass frame 1 can be attached to one side of a main eyeglass frame 31 of main eyeglasses 3 having a pair of lenses with a main function.

Referring still to FIG. 1, in the preferred embodiment of the present invention, a bridge 111 of the auxiliary eyeglass frame 1 is provided with a vertical receiving space 12 longitudinally penetrated through the bridge 11. A through hole 13 is formed on a rear wall of the receiving space 12.

Figure 4:
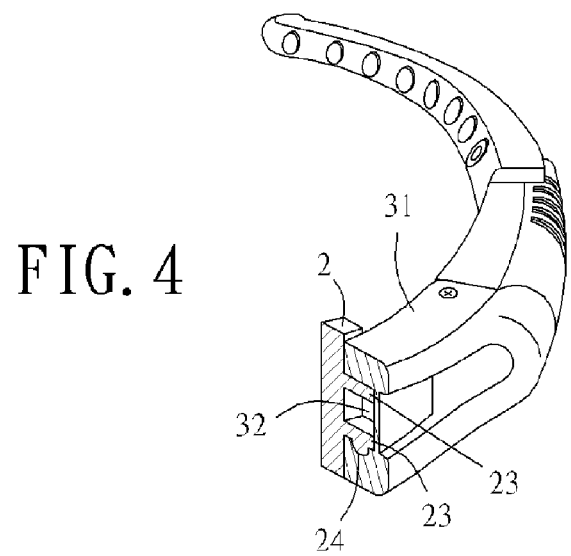
FIG. 4 is a cross-sectional view detailing the assembling operation of the protective strip of the auxiliary eyeglass frame and a main eyeglass frame of the main eyeglasses according to the preferred embodiment of the present invention.

The protective strip 2 is designed according to an upper section of the main eyeglass frame 31 and the auxiliary eyeglass frame 1. The protective strip 2 is adapted to combine with the auxiliary eyeglass frame 1 and provided with an inserting portion 21 extending downwardly from a central portion. A first projection 22 is projected rearward from the inserting portion 21. On each end of the protective strip 2 is provided with a pair of second projections 23 corresponding to a recess 32 formed on each end of the main eyeglass frame 31. An engaging point 24 is projected downward from each of the relatively lower second projection 23, as shown in FIG. 4.

Figure 2:
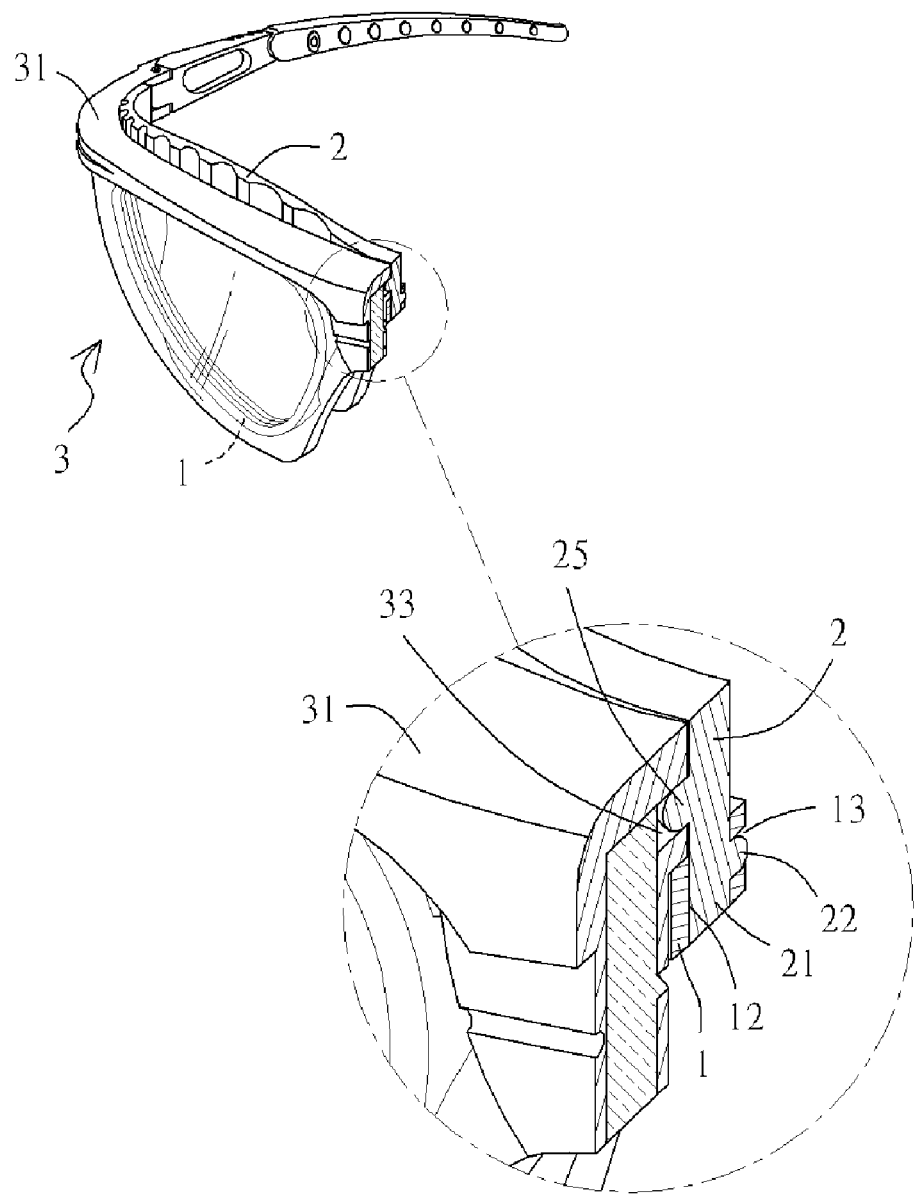
FIG. 2 is a cross-sectional view detailing the assembled auxiliary eyeglass frame and the main eyeglasses according to the preferred embodiment of the present invention.

Referring now to FIG. 2, in the preferred embodiment of the present invention, the protective strip 2 is combined with the auxiliary eyeglass frame 1, by inserting the inserting portion 21 of the protective strip 2 into the receiving space 12 of the auxiliary eyeglass frame 1 with the first projection 22 of the inserting portion 21 being engaged with the through hole 13 of the receiving space 12, for the purpose of easily and speedily connecting the protective strip 2 and the auxiliary eyeglass frame 1 to each other by an inserting and engaging operation as described above.

Figure 3:
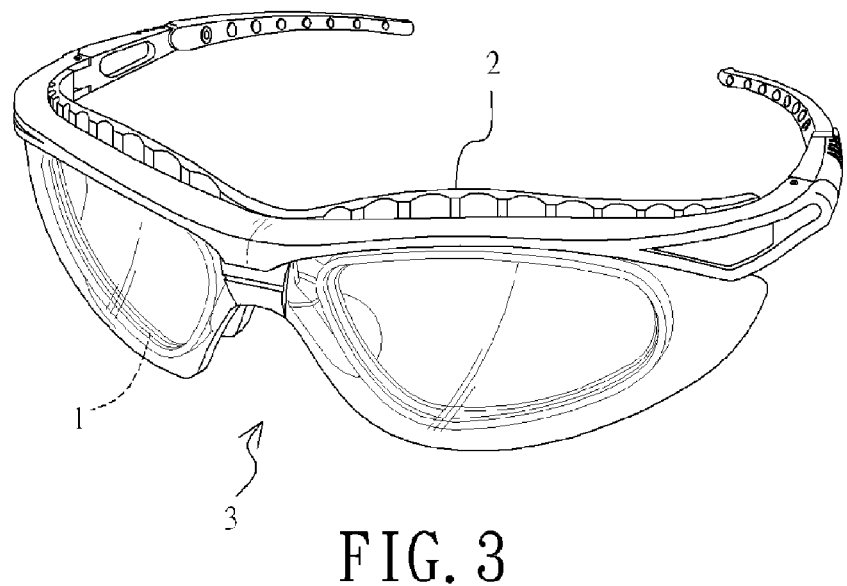
FIG. 3 is a perspective view of the assembled auxiliary eyeglass frame and the main eyeglasses according to the preferred embodiment of the present invention.

Referring now to FIGS. 2 and 3, in the preferred embodiment of the present invention, the central portion of the protective strip 2 is provided with a third projection 25 projected forward therefrom, while the main eyeglass frame 31 of the main eyeglasses 3 is provided with a depression 33 corresponding to the third projection 25. The combination of the auxiliary eyeglass frame 1 and the protective strip 2 is combined with the main eyeglass frame 31 of the main eyeglasses 3 by inserting the third projection 25 of the protective strip 2 into the depression 33 of main eyeglass frame 31. Meanwhile, the second projections 23 on both ends of the protective strip 2 are inserted into the recesses 32 of the main eyeglass frame 31. Furthermore, referring to FIG. 4, the engaging points 24 projected downward from the relatively lower second projections 23 are tightly engaged with the recesses 32 to firmly secure the protective strip 2 to the main eyeglass frame 31 and thus to stably and speedily attach the auxiliary eyeglass frame 1 to the main eyeglass frame 31 of the main eyeglasses 3. The combination of the auxiliary eyeglass frame 1, the protective strip 2 and the main eyeglass frame 31 can also be disassembled easily.

Referring back to FIGS. 2, 3, and 4, the present invention provides the following advantages:

1. The auxiliary eyeglass frame and the protective strip can be easily manufactured, and the assembling operation of the auxiliary eyeglass frame, the protective strip, and the main eyeglasses can be easily and speedily carried out, so that the manufacturing efficiency of the auxiliary eyeglass frame can be enhanced and the manufacturing cost thereof can be lowered down.

2. The protective strip is integrated with the auxiliary eyeglass frame having an additional function by inserting operation and engaging operation as described above. On one hand, the auxiliary eyeglass frame can be stably positioned on the main eyeglass frame via the protective strip. On the other hand, the auxiliary eyeglass frame with the protective strip can be conveniently detached from the main eyeglasses if necessary.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A positioning structure for auxiliary eyeglasses, comprising main eyeglasses having a main function, an auxiliary eyeglass frame for supporting lenses having an additional function, and a protective strip, the positioning structure characterized in that: the auxiliary eyeglass frame attached to a main eyeglass frame of the main eyeglasses has a bridge provided with a receiving space and a through hole formed on a back wall of the receiving space while the protective strip combined to the auxiliary eyeglass frame is provided with an inserting portion extending downwardly from a central portion and having a first projection projected rearward, and a pair of second projections on each end corresponding to a recess formed on each end of the main eyeglass frame with an engaging point being projected downward from each of the relatively lower second projection; wherein the inserting portion of the protective strip is correspondingly inserted into the receiving space of the auxiliary eyeglass frame with the first projection of the inserting portion being engaged with the through hole of the receiving space, and the second projections on both ends of the protective strip are correspondingly inserted into the recesses of the main eyeglass frame with the engaging points of the lower second projections being tightly engaged with the recesses, so as to stably and speedily attach/detach the auxiliary eyeglass frame with the protective strip to/from the main eyeglass frame.

\* \* \* \* \*